United States Patent [19]
Coburn et al.

[11] 3,874,127
[45] Apr. 1, 1975

[54] VACUUM CHUCK WITH SEALABLE CAVITY

[75] Inventors: Orin W. Coburn; Joe D. Stith, both of Muskogee, Okla.

[73] Assignee: Coburn Optical Industries, Inc., Muskogee, Okla.

[22] Filed: Jan. 3, 1973

[21] Appl. No.: 322,232

[52] U.S. Cl. ............................ 51/216 LP, 51/277
[51] Int. Cl. ........................................ B24b 41/06
[58] Field of Search......... 51/216 LP, 277; 137/516, 137/29; 29/235

[56] References Cited
UNITED STATES PATENTS

| | | | |
|---|---|---|---|
| 1,456,673 | 5/1923 | Dey | 51/235 |
| 2,198,765 | 4/1940 | Featherstone et al. | 51/235 |
| 2,688,220 | 9/1954 | Boutell | 51/235 |
| 3,029,835 | 4/1962 | Biello et al. | 137/516.29 X |
| 3,095,900 | 7/1963 | Newhall | 137/516.29 X |

FOREIGN PATENTS OR APPLICATIONS

| | | | |
|---|---|---|---|
| 197,152 | 5/1923 | United Kingdom | 137/516.29 |
| 401,399 | 4/1923 | Germany | 51/235 |

*Primary Examiner*—James L. Jones, Jr.
*Attorney, Agent, or Firm*—John J. Byrne

[57] ABSTRACT

Disclosed is a system for blocking an opthalmic lens blank by means of a vacuum. The lens blank rests on the chuck and forms an air pocket or cavity therebetween which is evacuated by means of a vacuum pump. After evacuation, an elastic plug is inserted in an aperture in the chuck by atmospheric pressure to maintain the vacuum. The lens is disengaged from the chuck by peeling the plug back and thereby releasing the vacuum.

1 Claim, 10 Drawing Figures

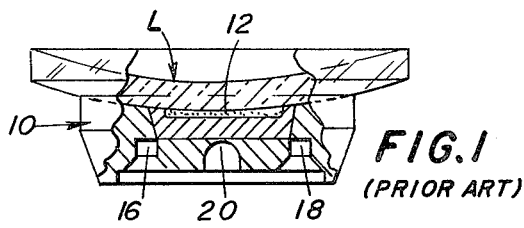
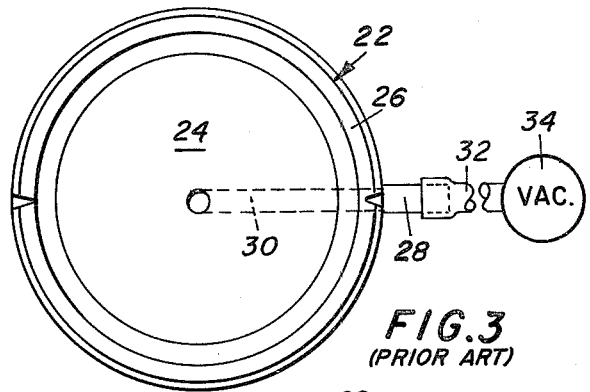
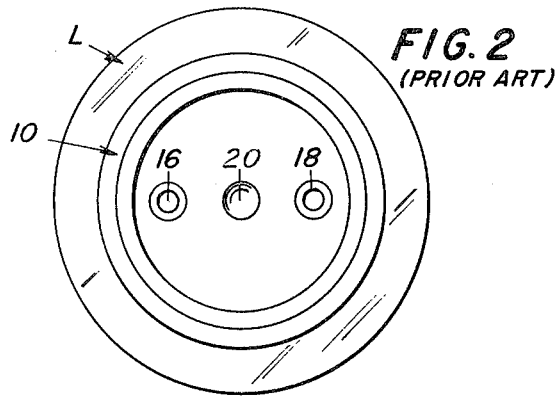
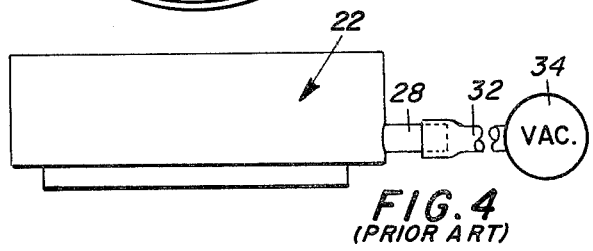
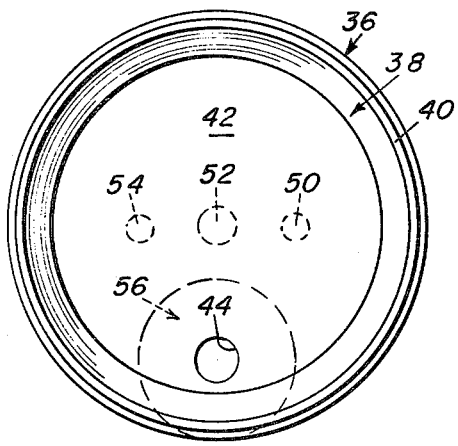
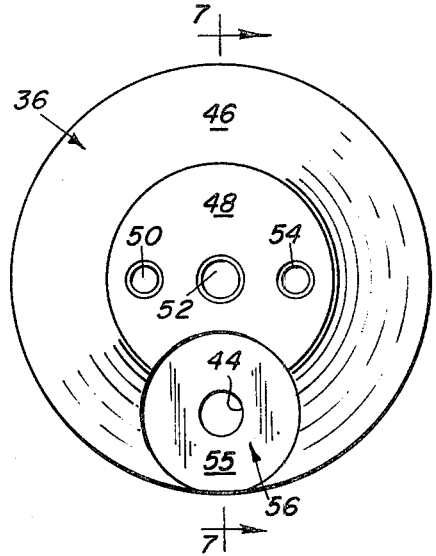
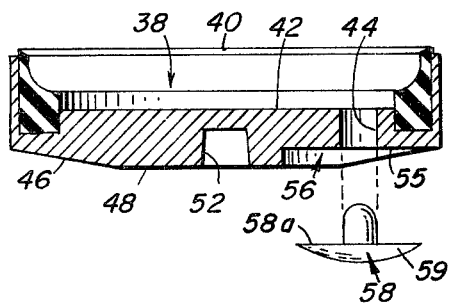

3,874,127

VACUUM CHUCK WITH SEALABLE CAVITY

BACKGROUND OF THE INVENTION

1. Field of the Invention

This device relates to the art of ophthalmic lens grinding. In particular, an apparatus is described for blocking a lens by vacuum. The apparatus includes a feature which will maintain the vacuum without the necessity of vacuum hoses.

2. Description of the Prior Art

One of the most troublesome aspects in finishing lens blanks to prescription curvatures is the gripping of the blank during processing. The lens blank itself is either glass or plastic, it is somewhat fragile, and must be securely gripped in a manner to withstand grinding stresses. The prior art teaches many ingenious ways of "blocking" a lens for this purpose. A common method is to secure a steel block to one lens surface through the use of pitch or the like (See Fritzche U.S. Pat. No. 2,465,153). Another common method is to employ a low melting point alloy to attach the lens to the block (See U.S. Pat. No. 3,468,366, for instance). In each of the prior art methods, the lens blank is oriented with respect to the block. After finishing, the block must be removed and the lens cleaned. The alloy must be recovered for economic reasons and the pitch is a troublesome product with which to work.

A new method has been recently developed for blocking lens blanks which includes the use of an evacuated cavity to hold the lens to the block. Such an application is described in U.S. Application Ser. No. 217,469 by Orin W. Coburn and Joe D. Stith. The technique disclosed therein is to place a lens on a block having a sealed cavity where the lens rests and then withdrawing the air from the cavity so that vacuum holds the lens in place on the block. The vacuum in the cavity is maintained by means of a pneumatic hose connected to a vacuum drawing pump. The present invention provides a system wherein a lens can be blocked by vacuum and that vacuum maintained without the encumbering vacuum hose.

SUMMARY OF THE INVENTION

The present invention is an improvement over prior vacuum blocking systems in that it is possible to eliminate the necessity of a vacuum hose once the holding cavity has been evacuated. The vacuum in the cavity is maintained by inserting an especially designed elastic plug into a block orifice from which the vacuum was drawn. The plug maintains the cavity at subatmospheric pressure and, of course, thereby eliminates the necessity of a hose. A novel mechanism is employed to insert the elastic plug into the orifice after the cavity between the lens and the chuck has been evacuated.

It is an object of the present invention to provide an improved means and method of vacuum blocking a lens.

It is another object of the present invention to provide a simple means of blocking a lens without using materials such as hot pitch or low melting point alloys.

It is a further object of the invention to simply and economically vacuum block a lens and then remove the hose thereto while maintaining the vacuum in the vacuum chuck constant.

It is yet another object of the present invention to vacuum chuck a lens so that the lens and chuck are freely movable without the encumbrance of the vacuum hose.

These and other objects of the invention will become more apparent to those skilled in the art by reference to the following detailed description when viewed in light of the accompanying drawings wherein:

FIG. 1 is an elevation view, partially in section, of a prior art block of the type employing pitch or low melting point alloys;

FIG. 2 is a bottom view of the prior art unit shown in FIG. 1;

FIG. 3 is a plan view of a prior art vacuum chuck;

FIG. 4 is a side elevation of the unit shown as FIG. 3;

FIG. 5 is a top plan view of the vacuum chuck according to the present invention;

FIG. 6 is a bottom plan view of the unit shown as FIG. 5;

FIG. 7 is a cross-sectional view of the unit according to a preferred embodiment as also shown in FIGS. 4 and 5;

DESCRIPTION OF PREFERRED EMBODIMENT

Figure 8:
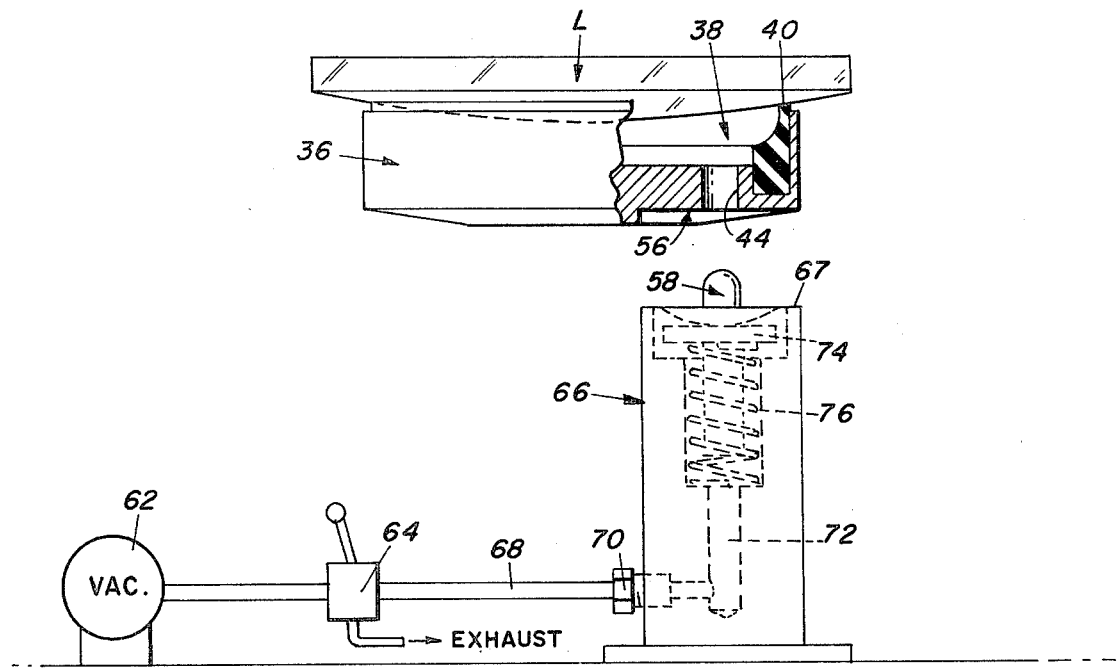
FIG. 8 is a schematic representation of the method and apparatus used for inserting a plug into the vacuum chuck with the lens block and plug inserter greatly enlarged for purposes of illustration.

Referring now to the drawing wherein lilke numerals indicate like parts, FIGS. 1 and 2 indicate a common method of lens blocking according to the prior art. In this method, a lens L is secured to a block 10 by way of an adhesive 12. The member 10 can be steel or a formed-in-place metallic or plastic block. The block is circular for ready reception in chucking equipment. One of the surfaces is formed with detents or depressions 16 and 18 and oftentimes with a center detent 20. These detents frequently receive hardened inserts for the reception drive pins associated with grinding and polishing equipment. The adhesive 12 is generally a pitch or an alloy with a low melting point.

FIGS. 3 and 4 show a vacuum chuck according to that disclosed in Ser. No. 217,469 by Orin W. Coburn and Joe D. Stith. According to this method, a metal block 22 forms the body of the chuck. The interior of the body 22 is a dish-shaped depression 24 around the rim of which is located a rubber gasket member 26. When a lens blank is placed on top of the chuck a cavity is formed between the lens and the dish-shaped depression 24. A vacuum may be drawn on that cavity via a fitting 28 and an internal passageway 30. FIG. 4 shows how the fitting 28 is connected via a piece of vacuum tubing 32 to a source of vacuum 34. The lens blank is secured in its position on the vacuum chuck by the vacuum drawn by vacuum source 34. An advantage of the method shown as FIGS. 3 and 4 over the prior art methods shown in FIGS. 1 and 2 is that it is not necessary to use substances like pitch or low melting point alloys which must be subsequently removed from the lens and recovered. As mentioned previously, one disadvantage of the method shown in FIGS. 3 and 4 is that it is necessary to maintain a vacuum within the dish-shaped cavity 24 and this is done by means of tubing 32 and vacuum source 34. This restricted grinding operations to the vicinity of the vacuum source. Here, the vacuum hose 32 and vacuum source 34 can be detached from the block to thereby improve the manageability and mobility of the lens and its chuck.

FIG. 5 shows a top plan view of the vacuum chuck according to a preferred embodiment. The apparatus includes a block member 36 serving as a holder for an elastomer seal 38. Elastomer 38 is annular to fit the contour of the metal block member 36 and is beveled slightly inwardly on the top surface thereof to evenly receive the lens L to be blocked. Elastomer seal 38 also includes a small lip portion 40 for insuring a good vacuum enclosure. The base of block member 36 is indicated by the numeral 42. Base or depression 42 serves the same function as dish-shaped depression 24 in FIG. 3. That is, it forms a cavity 43 with the seal 38 and the lens from which air is withdrawn so that a lens will adhere to the metal block member by vacuum. The base 42 includes an aperture 44 which connects the interior of the block to a source of vacuum.

FIG. 6 is a bottom view of the vacuum chuck assembly. The back or bottom surface includes an annular beveled area 46 surrounding the periphery of a flat, back surface 48. The surface 48 includes a series of detents 50, 52, and 54. These detents are directly analogous to those in FIG. 2 as depressions 16, 18, and 20. The detents are typically formed to receive steel hardened metal inserts for use with grinding apparatus. Center detent 52 is located in the symmetrical center of the block 36 and detents 52 and 54 are located at equal distances from detent 52. The detents lie in a common plane. Detents 50, 52, and 54 do not extend into cavity 43 on the inside of block 36.

Located outwardly of detent 52 is a recessed area 56 extending from the bevel 46 on the edge of block 36 toward detent 52 and into back surface 48 for a short distance. The flat surface 55 of recess 56 accommodates the enlarged, thin head portion 58 of an elastic plug 59. The plug includes a nipple portion 57 for insertion into the aperture 44 and the head is formed with a flat surface 58 about the nipple 57. It is important that elastic plug 58 be adapted to make a good vacuum seal on surface 55.

FIG. 7 is a cross-sectional view of the vacuum chuck according to FIGS. 5 and 6. The nipple 57 of plug 58 extends far enough into aperture 44 that a good vacuum seal between the cavity 43 can be formed when the lens blank B is seated on elastomer seal 38.

Figures 9, 10:
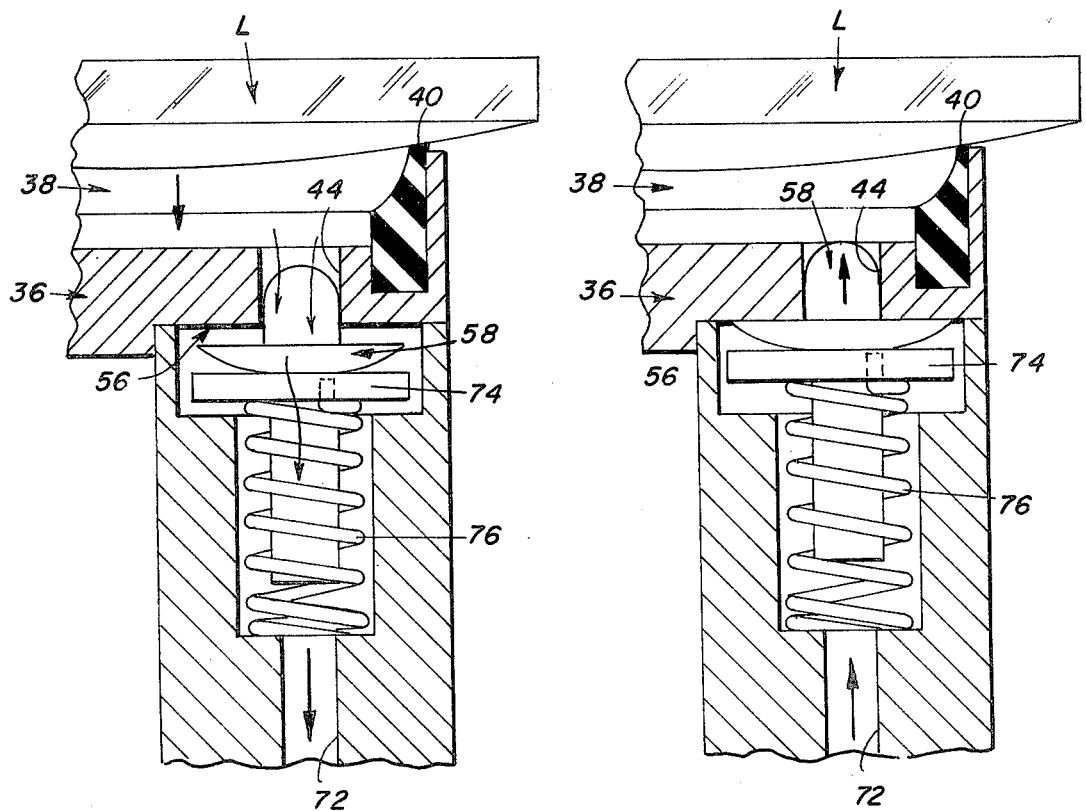
FIG. 9 is a detailed cross-sectional view of the plug inserting unit and the chuck shown as the cavity of the chuck is being evacuated.
FIG. 10 is another cross-sectional view similar to FIG. 9 showing how the elastic plug is received in the vacuum chuck subsequent to evacuation.

The improved vacuum chucking apparatus is shown in FIGS. 8, 9, and 10. A vacuum pump 62 is communicated to the interior 72 of the plug inserter housing via conduit 68 and fitting 70. A pneumatic switch 54 is disposed in conduit 68 for controlling the application of a vacuum. The cavity 72 is machined to provide room for a plunger element 74 and a plunger biasing spring 76 which tends to lift plunger 74. The upper rim 67 of plug inserter unit 66 is adapted to engage the surface 55 of recess 56.

FIG. 9 is a cross-sectional view showing unit 66 mated in position with block 36. When a plug member 56 is placed on plunger 74, its surface 58 is just even with or slightly below the rim 67. As seen in FIG. 9, a block is placed on unit 56 with rim 67 about aperture 60. A lens blank B is placed over member 40 and cavity 42 is formed. An operator then turns on vacuum switch 66 so that air is withdrawn from cavity 42 through aperture 60, about the plug 58, into plug cavity 72, and eventually out through fitting 70, vacuum hose 68, to the vacuum pump 62. During the evacuation step the air withdrawn from cavity 42 encounters little resistance when passing around plug 58 because plunger biasing spring 76 is not strong enough to prevent air from flowing out of cavity 42 and the peripheral edges of head 58 can bend slightly during evacuation.

After cavity 42 has been evacuated to a selected pressure, line 68 is vented to atmosphere. FIG. 10 shows, in cross-sectional view, the effect of venting line 68 to the atmosphere. As atmospheric pressure enters cavity 72, a force is exerted on the top of plug 58 and drives it home into passageway 60. At this point, the plug inserter unit 66 may be lifted from the block 36. Elastic plug 58 will remain in place, held there because of the vacuum in cavity 42 and the pressure on the outside of the block. The vacuum in cavity 42 also secures lens L so that it remains effectively fastened to block 36 as long as a vacuum is maintained therein.

The blocked lens can now be removed to any location without the encumbrance of a vacuum hose. Even though the lens is firmly secured to the block, deblocking operation is relatively simple. To remove the lens L from block 36 one merely lifts or peels the edge of elastic plug 58 until the vacuum is broken. In this manner, the lens can be removed simply and quickly from the block 36 without the mess of heated pitches or low melting point alloys. The block can be used again and again.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

We claim:

1. An apparatus for inserting a plug into an aperture which in turn will seal an evacuated chamber formed by a lens blank and a blocking member wherein said plug is of a type having a domed head on one surface thereof and having a flat surface on the other surface thereof wherein said surfaces meet at a relatively thin periphery, a nipple extending from said flat surface and said blocking member having a second flat surface about said aperture wherein the improvement comprises, a housing having an interior cavity leading to an annular upper edge and said edge adapted for positioning against said flat surface about said aperture, a platform means reciprocally received within said cavity and normally disposed in a position at a distance from said edge an amount equal to the thickness of said domed head, a spring means in said cavity for biasing said platform means to said position wherein said nipple extends into said aperture and said surface circumscribes the peripheral area about said aperture, a vacuum source, a conduit means for communicating said vacuum source with said interior cavity, and a valve means located in said conduit means for selectively communicating said cavity to atmosphere or to said vacuum source and wherein said vacuum source is sufficiently strong to distort said periphery of said plug to thereby communicate the vacuum of said cavity to said chamber and said valve means interrupting said communication to the vacuum source and immediately exposing said cavity to atmospheric pressure whereby said distorted edge will be pressured snugly against said second flat surface.

* * * * *